United States Patent [19]
Sodek, Jr. et al.

[11] Patent Number: 5,410,672
[45] Date of Patent: Apr. 25, 1995

[54] APPARATUS AND METHOD FOR THE HANDLING OF BANDED FRAME BUFFER OVERFLOWS

[75] Inventors: Franklin L. Sodek, Jr., Temple; John R. Howell, Bruceville, both of Tex.

[73] Assignee: Texas Instruments Incorporated, Dallas, Tex.

[21] Appl. No.: 193,617

[22] Filed: Feb. 8, 1994

Related U.S. Application Data

[60] Continuation of Ser. No. 12,676, Feb. 3, 1993, which is a division of Ser. No. 926,131, Aug. 5, 1992, Pat. No. 5,218,670, which is a continuation of Ser. No. 576,532, Aug. 31, 1990.

[51] Int. Cl.$^6$ ............................................. G06F 15/00
[52] U.S. Cl. .................................... 395/425; 395/250; 395/116
[58] Field of Search ............... 395/250, 425, 115, 116; 364/519, 930

[56] References Cited

U.S. PATENT DOCUMENTS

| | | | |
|---|---|---|---|
| 4,791,564 | 12/1988 | Takai | 364/DIG. 1 |
| 4,920,483 | 4/1990 | Pogue et al. | 364/DIG. 1 |
| 4,933,877 | 6/1990 | Hasche | 364/521 |
| 4,953,103 | 8/1990 | Suzuki | 364/519 |
| 5,032,981 | 7/1991 | Bril et al. | 364/DIG. 1 |
| 5,218,670 | 6/1993 | Sodek, Jr. et al. | 395/115 |
| 5,276,781 | 1/1994 | Chang et al. | 395/116 |

*Primary Examiner*—David L. Robertson
*Attorney, Agent, or Firm*—Ronald O. Neerings; James C. Kesterson; Richard L. Donaldson

[57] ABSTRACT

A method is provided for handling overflows of data blocks in a system using a banded buffer. A block of data is transferred from a memory to a first band in the banded buffer. A determination is made that a portion of the block of data being transferred exceeds a boundary of the first band, and in response a description block for the portion of the block of data which exceeds the boundary of the first band is created. The description block is written into a memory queue and when a second band in the banded buffer becomes available, that portion of the data block which exceeds the boundary of the first buffer band is transferred into the second buffer band.

18 Claims, 5 Drawing Sheets

APPARATUS AND METHOD FOR THE HANDLING OF BANDED FRAME BUFFER OVERFLOWS

This application is a Continuation of application Ser. No. 08/012,676 filed Feb. 3, 1993 which is a divisional of application Ser. No. 07/926,131 filed Sep. 5, 1992, now U.S. Pat. No. 5,218,670, which is a continuation of application Ser. No. 07/576,532 filed Sep. 31, 1990.

TECHNICAL FIELD OF THE DISCLOSURE

The present invention relates in general to laser page printers, and more particularly to apparatus and methods for the handling of banded frame buffer overflows.

BACKGROUND OF THE DISCLOSURE

By industry convention, most laser page printers have a resolution of 300 horizontal by 300 vertical dots per inch. If a full page print image buffer is used to achieve this resolution, approximately one megabyte of memory is required for an 8.5×11 in. page, and over 1.25 megabyte for a legal size page. Thus, a full page print image buffer approach requires that the manufacturer design in a large amount of relatively costly memory hardware into the laser printer. Most laser printer manufacturers, however, use a banded, or partial page, print buffer approach to reduce the amount of memory hardware required. Using the banded print buffer approach, a page is broken into smaller bands that are imaged as the page is being printed. Typically, 64 Kbytes or less of memory is broken into two print buffers, and while one band is being printed, the other band is being imaged, the process repeating itself until the entire page is printed.

While the banded print buffer approach significantly reduces the memory hardware required, it also introduces significant processing complications. Most laser printer systems employ hardware called bit block transfer units to assist the processor in moving blocks of image data from system memory into the print image buffer. If the image data blocks that are being transferred exceed boundaries of the available band buffer, they get sliced or clipped, and the remainder of the block cannot be transferred until the next band becomes available for imaging.

Currently available bit block transfer units generate an interrupt to the processor when an image being transferred into the band buffer overflows the current band. The processor then executes an interrupt service routine that reads all of the internal registers of the transfer unit to determine where in the block the overflow occurred, and then saves those parameters in memory so the block transfer can be restarted and completed when the next band becomes available. Each character or image data block that overflows the band buffer boundary interrupts the processor, and therefore requires attention. The interrupt and the execution of the interrupt service routine results in real time use of processor overhead. Not only does this waste precious processor time, but may also result in a system error. If the print engine remains running (continuing the printing operation), the processor may not be able to complete the required tasks necessary to maintain orderly control of the print engine and the data flow to it, and a system error may result. Finally, since the control circuitry is less dependent on CPU service, more complex pages can be printed.

Thus, a need has arisen for a means to handle the overflow of image data blocks being transferred into the band buffer, without a heavy demand on system processor overhead.

SUMMARY OF THE DISCLOSURE

According to the invention, a method is provided for handling overflows of data blocks in a system using a partial page on banded buffer. A block of data is transferred from a memory to the first band in the banded buffer. When a determination is made that a portion of the block of data being transferred exceeds a boundary of the first band, a description block is created for the portion of block of data which exceeds the boundary of the first band. The description block is then written into a memory queue, and when a second band in the buffer becomes available, that portion of the data block which had exceeded the boundary of the first buffer band, is transferred into the second buffer band in accordance with the description block.

In accordance with other aspects of the invention, the block of data being transferred is an image data block being transferred from system memory into a banded buffer memory in a laser printer system. The description block contains parameters defining the location in system memory from where the portion of the image data block that overflow the first band is located and can be retrieved, and parameters define the location in the second band to where that portion of the data block is to be sent. For further efficiency in implementing the invention, the description block for the overflow portion of the image data can be stored in a memory queue in the buffer memory itself.

Thus, according to the invention, a means has been provided for handling the overflow of image data blocks being transferred into a laser printer band buffer memory without heavy demand on processor overhead. This frees the system processor to perform other tasks, thereby improving the speed of the printing process while at the same time reducing the chances of system error.

BRIEF DESCRIPTION OF THE DRAWINGS

Other aspects of the invention and their advantages will be discerned when one refers to the following detailed description as taken in conjunction with the drawings, and which like numbers identify like parts and in which.

DETAILED DESCRIPTION OF THE DISCLOSURE

Figures 1, 2:
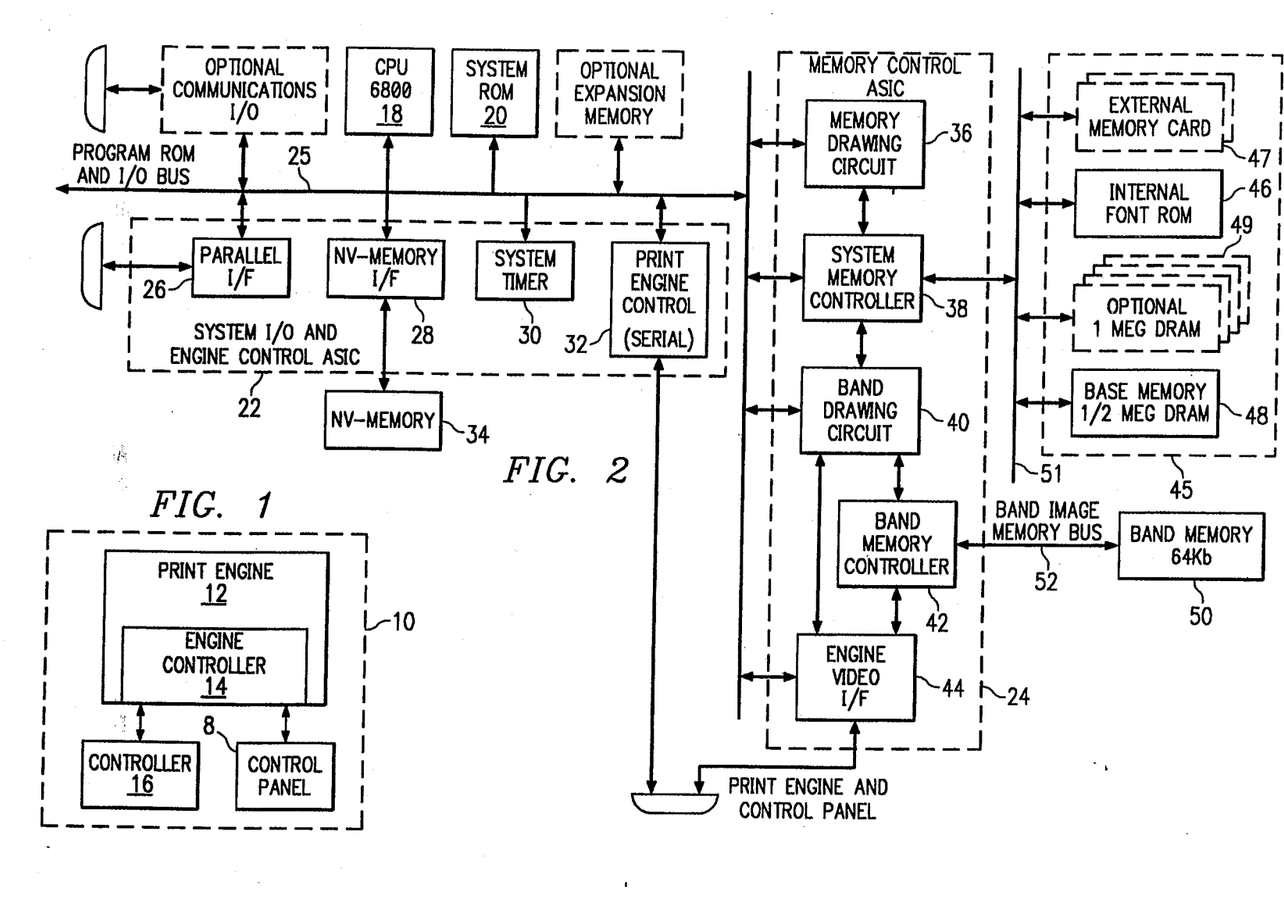
FIG. 1 is a top level block diagram of a laser printer system.
FIG. 2 is a block diagram of the laser printer controller depicted in FIG. 1.

Referring first to FIG. 1, a top level block diagram of a laser printer 10 is depicted. Laser printer 10 includes a print engine 12, an engine controller 14 associated with print engine 12, a controller 16 and a control panel 8. Print engine 12 is well known in the art and includes the laser diode, drum and other mechanical apparatus required to print a desired image on a sheet of paper. Engine controller 14, also known in the art, receives video data carrying the image to be printed from controller 16, and sends clocks and synchronizing signals back to controller 16. Control panel 8 allows the user of laser printer 10 to manually input data and commands such as those required to change paper size, fonts, and the like.

Referring next to FIG. 2, an overall block diagram of controller 16 is depicted. The architecture of controller 16 is formed around a microprocessor, such as the MOTOROLA 68000 central processing unit (CPU) 18. Central processing unit 18 is coupled to system ROM 20, system input/output and engine control section 22, and memory control section 24 through program ROM and input/output bus 25.

System ROM 20 contains a permanent operating instructions set for CPU 18. System input/output and engine control section 22 includes parallel interface 26, non-volatile memory interface 28, system timer 30 and print engine control 32. Parallel interface 26 allows communication between laser printer 10 and the host computer system (not shown) with which the laser printer is operating. Print data describing the images to be created by the laser printer 10 are transferred from host computer across interface 26. Non-volatile memory interface 28 allows for communication between CPU 18 and associated nonvolatile memory 34 containing operating data. The system timer 30 provides the necessary clocks and synchronization signals necessary for the operation of CPU 18 and for the transfer of data between the respective subunits of controller 16. Print engine control 32 provides a serial interface for sending commands to and receiving status data from engine controller 14, and for the serial transfer of data to control panel 8.

Memory control section 24 includes a memory drawing circuit 36, system memory controller 38, band drawing circuit 40, band memory controller 42, and engine video interface 44. Memory drawing circuit 36 and memory controller 38, under the direction of CPU 18, control the flow of data from system memory 45 (including internal font ROM 46, external memory card 47, DRAM base memory 48, and optional dynamic RAM 49) through system DRAM and font ROM bus 51. Band drawing circuit 40, described in detail below, and band memory controller 42 control the input of image data to band memory 50 through band memory bus 52 from system memory 45. Finally, engine video interface 44 allows band memory controller 42 to transfer the print images from band memory 50 to print engine controller 14.

Figure 3:
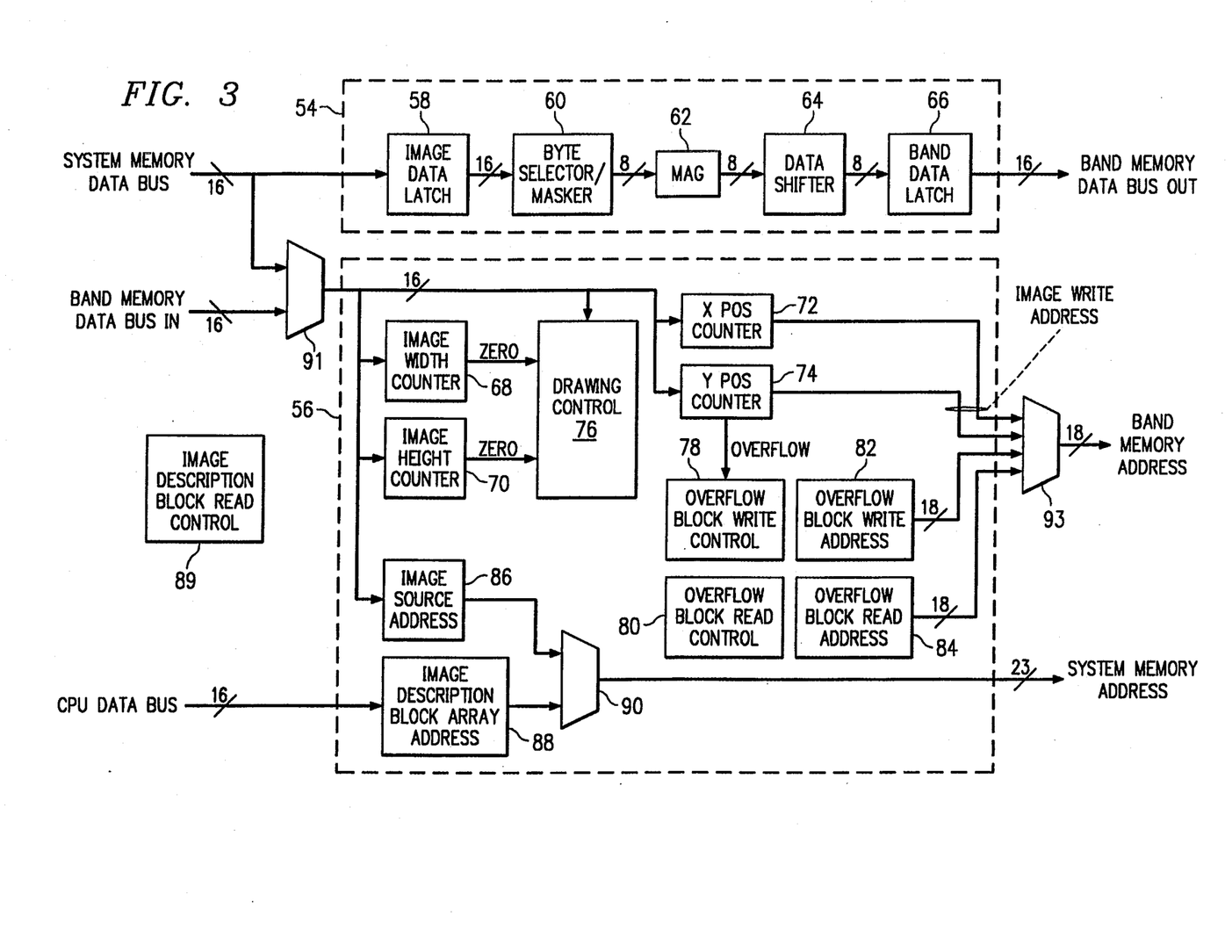
FIG. 3 is a block diagram of a band drawing circuit according to the invention and as depicted in FIG. 2.

Referring to FIG. 3, a block diagram is shown depicting the major components of band drawing circuit 40 according to the invention. A brief description of the interconnections between the blocks and their individual functioning will be provided first, followed by a more detailed description of band drawing circuit 40 as it operates in laser printer controller 16. Band drawing circuit 40 is most easily described in two sections. The first section is the unidirectional data path shown by dotted lines at 54 which allows for the communication of image data blocks from system memory 45 to band memory 50. The second section shown by dotted lines at 56 creates the address denoting the location in system memory 45 from where the image data blocks are to be retrieved and the address denoting the location in band memory 50 to where the image data blocks will be sent. Section 56 also provides processing when either of the two bands in band memory 50 has overflowed. These features will be discussed in greater detail below.

Unilateral data path 54 receives two eight bit bytes in image data latch 58. Byte selector 60 is coupled to the output of data latch 58 and selects one of the two bytes held in data latch 58 to be sent on to the band memory 50. Magnification circuit 62 is operable to magnify data received from byte selector/masker 60 to create an image up to four times larger than defined by the received image data in the horizontal and/or vertical direction. Data shifter 64 is coupled to horizontal magnification circuitry 62 which allows the received image data to be shifted up to seven bits, such that the image can be placed in band memory with one bit accuracy. Band data latch 66, coupled to data shifter 64, holds the image data until a write request is sent following the generation of the address by address section 56, delivering the data into band memory 50.

Band memory address section 56 is operable to receive image description blocks generated by CPU 18 and in response generates addresses for reading image data from system memory 45 and for writing image data into band memory 50. A detailed description of the image description blocks will be provided in conjunction with the discussion of FIG. 5 below. Image width counter 68 (a 9 bit counter) and image height counter 70 (a 13 bit counter) count down from a loaded value indicating the height and width of the image being drawn. When image width counter 68 and image height counter 70 have reached zero, the entire image data block has been transferred. X-position counter 72 and Y-position counter 74 are a pair of nine bit counters which are loaded with a value indicating the upper left corner of a block of image data and then increment to locate each byte of data in band memory in relationship thereto. Image width counter 68, image height counter 70 X-position counter 72 and Y-position counter 74 are coupled to drawing control circuitry 76, which comprises a series of state machines which control the counters 68, 70, 72 and 74 for generation of a band memory address for each byte of image data written. Drawing control circuitry 76 also controls data path circuitry 54 for generation of image data to written into band memory 50.

Overflow block write control 78 and overflow block read control 80 control the handling of image description blocks which exceed the Y-direction boundary (the lower boundary) of the band memory. Overflow block write control 78 contains state machines which control the writing into band memory 50 of an image description block created to describe the portions of the image data blocks which overflow the band memory. Overflow block read control 80 contains state machines to control the reading of these image description blocks when a new band is available to receive the overflowed image data. Overflow block write address 82 and overflow block read address 84 are 18 bit counters which determine positions in band overflow memory, in which overflow image description blocks are stored pending the availability of the next memory band.

Image source address circuitry 86 is a 23 bit upcounter which determines the location in system memory 45 from which the image data is being retrieved. Image source address circuitry 86 is controlled by drawing control circuitry 76. Image description block array address 88 is also a 23 bit upcounter which determines the location of image description blocks for the image data in system memory. The outputs of image source address 86 and image description block array address circuitry 88 are multiplexed by multiplexer 90 to provide a system memory address for retrieval of data from system memory 45. Image description block read control circuitry 89 is a state machine that controls image description block array address 88 and multiplexer 90 for generating the addresses of description block data located in system memory and for controlling the loading of description data into image source address 86, image width 68, image height 70, X position 72, Y-position 74 counters. Multiplexer 93 selects between the three sources for generation of band memory addresses; image data write address formed by concatenation of X-position 72 and Y-position 74 circuitry; overflow block write address 82; and overflow block read address 84.

Figure 4:
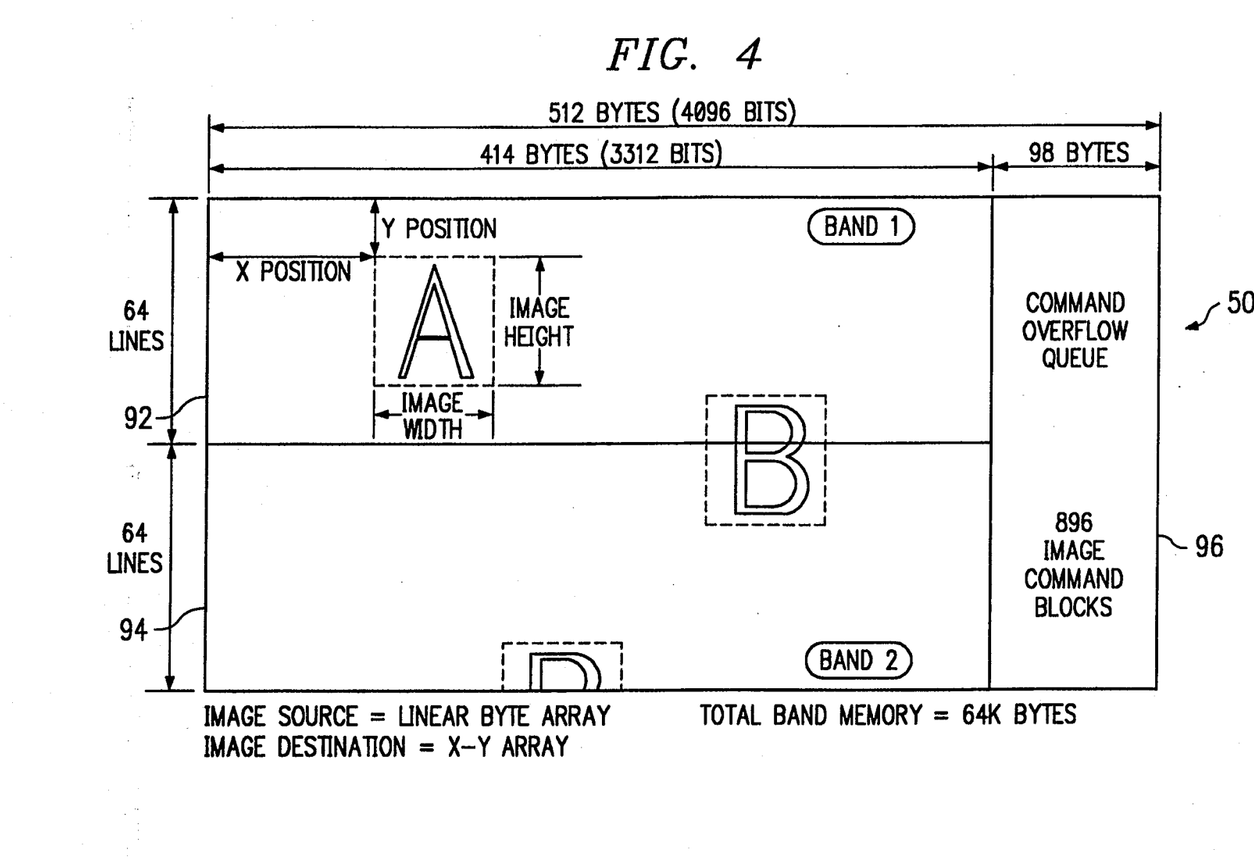
FIG. 4 is a dimensional layout depicting the format of the band memory depicted in FIG. 2.

The operation of band drawing circuit 40 is best described by first referring to FIG. 4, which depicts the band memory frame buffer format of band memory 50. The band memory is divided into two sections for the receipt of images, each section being 414 bytes (3312 bits) in width, and 64 lines in height. Each image data block to be transferred to band memory is defined by its image height and image width in bytes. The position of each image data block is defined by the X/Y-position of the upper left hand corner of the block. In FIG. 4, the block depicting the letter "A" is shown as an example. The letter "B" is another example of an image data block. However, this image data block has overflowed band one and now has extended into band two. The band memory also contains a command overflow queue 96 which is 98 bytes wide and 128 lines long, and is capable of storing 896 overflow image description blocks.

When print codes are received from the host computer directing the print out of desired page, CPU 18 directs the generation of a list of image description blocks which control the transfer of image data blocks from system memory 45 to band memory 50, composing the band of images to be printed.

Figure 5:
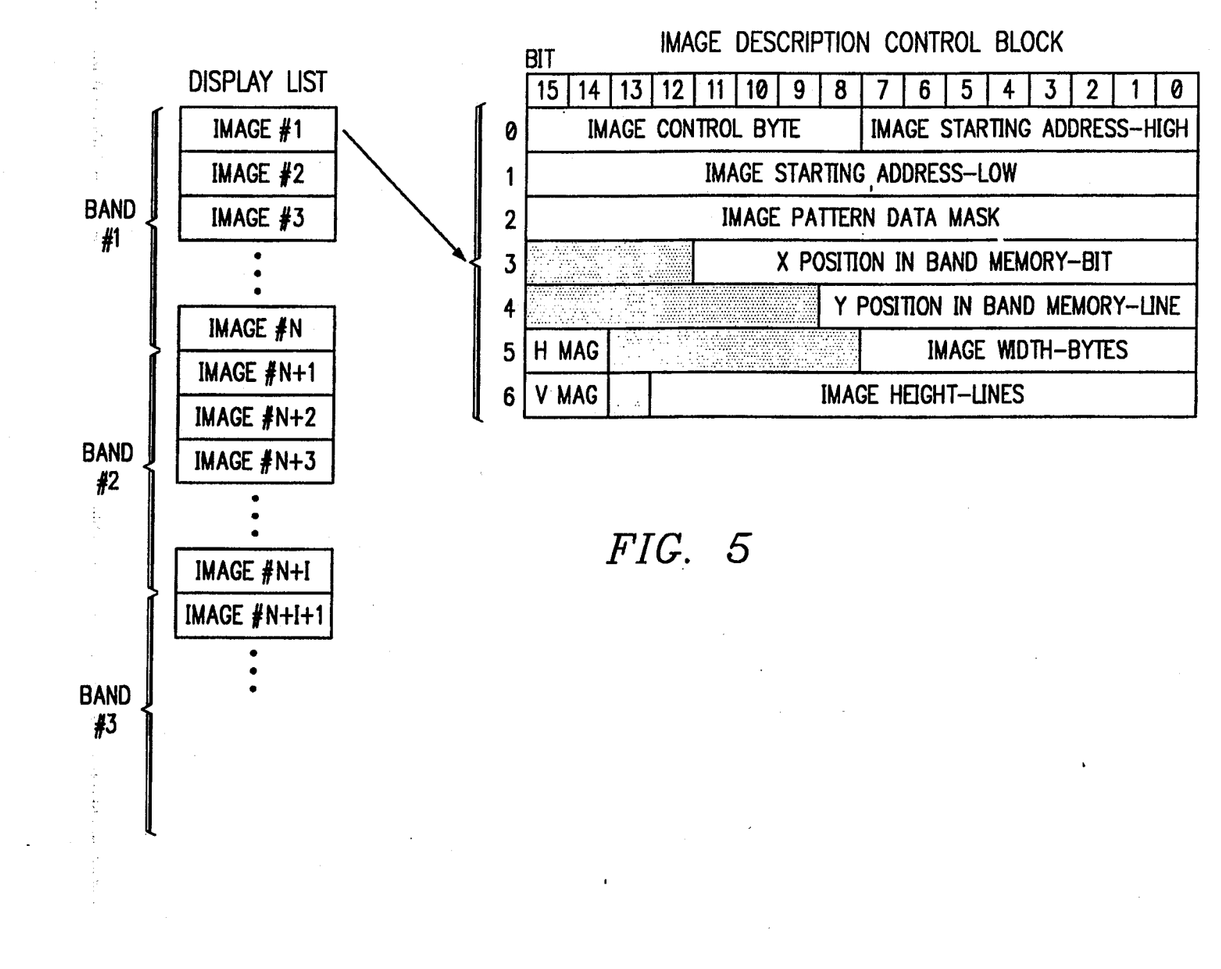
FIG. 5 is a diagram depicting the format of an image description control block.

FIG. 5 depicts a typical image description block, and the sequence of bytes composing it. Each image description block is formed of seven words of 16 bits, some of which are divided into functional bytes. The image control byte controls the mode of drawing into band memory, designating if an image is the last image in the band, and designating if the image is the last image in the display list. The image starting address is a 24 bit address that defines the starting address of the binary image in system memory 45. The image pattern data mask determines which of the sixteen bits received in data latch 58 will be masked by byte selector/masker 60. The X-position bits load the X-position counter 70 and control the data shifter 64, determining the X-location (horizontal) where the upper left corner of the binary image is to be placed in band memory 50 as shown in FIG. 4. The Y-position bits load the Y-position counter 74, determining the Y-location (vertical) where the upper left hand corner of the binary image is to be placed in band memory 50 as shown in FIG. 4. The image width bits load image width counter 56 and determine the width in bytes of the image shown in FIG. 4. The image height bits load the image height counter 70 and determine the height of the image loaded into band memory 50 in lines, as shown in FIG. 4. The horizontal magnifier and vertical magnifier bits determine the magnification required by magnification circuitry 62 for the expansion of the image data received from system memory 45 as it is placed in band memory 50.

The CPU 18 computes the data for the image description blocks as it receives data from the host computer through the parallel interface 26. The CPU stores the image description blocks in system memory 45. The CPU loads the starting address of the list of image description blocks into the image description block array address counter 88. The band drawing circuit retrieves the image description blocks from system memory 45, reads the corresponding image data from system memory 45, and directs the image data to the proper address in the band memory 50. Blocks of image data are thus transferred into band memory 50 until a flag in the last image description block in the list is detected, at which time that section of band memory 50 is made available to engine video interface 44 for delivery to the print engine to be imaged on paper. A problem arises during this process when the height in lines (the Y-direction) of a block or blocks of image data exceeds the lines available in the band, as indicated by the letter "B" in FIG. 4. In prior art laser printers, this situation would require an interrupt to be issued to the central processing unit such that the transfer of image data is halted and a service routine can be executed by the central processing unit such that the clipped data can be accounted for.

In the present invention, no interrupt command is required. When the Y-position counter indicates an address outside the present band, image description blocks are created for each of the overflowed portions of the image data blocks and are stored in command overflow queue 96 awaiting the next available band in the band memory 50. The image description blocks describe the dimensions and addresses for the overflowed data, similar to the image description blocks used to initially draw data from system memory 45. When processing begins on the next band, the image description blocks for the overflowed image data are first retrieved from command overflow queue 96 and the data is stored in the appropriate counters through multiplexer 91 for execution in band drawing circuit 40. Image description blocks are always brought out of band memory 50 command overflow queue 96 before the processing of image description blocks from system memory 45 for the next available band, because image data blocks remaining to be transferred may overflow the band boundary again - a new description block would then be created and stored on the command overflow queue.

Figure 6:
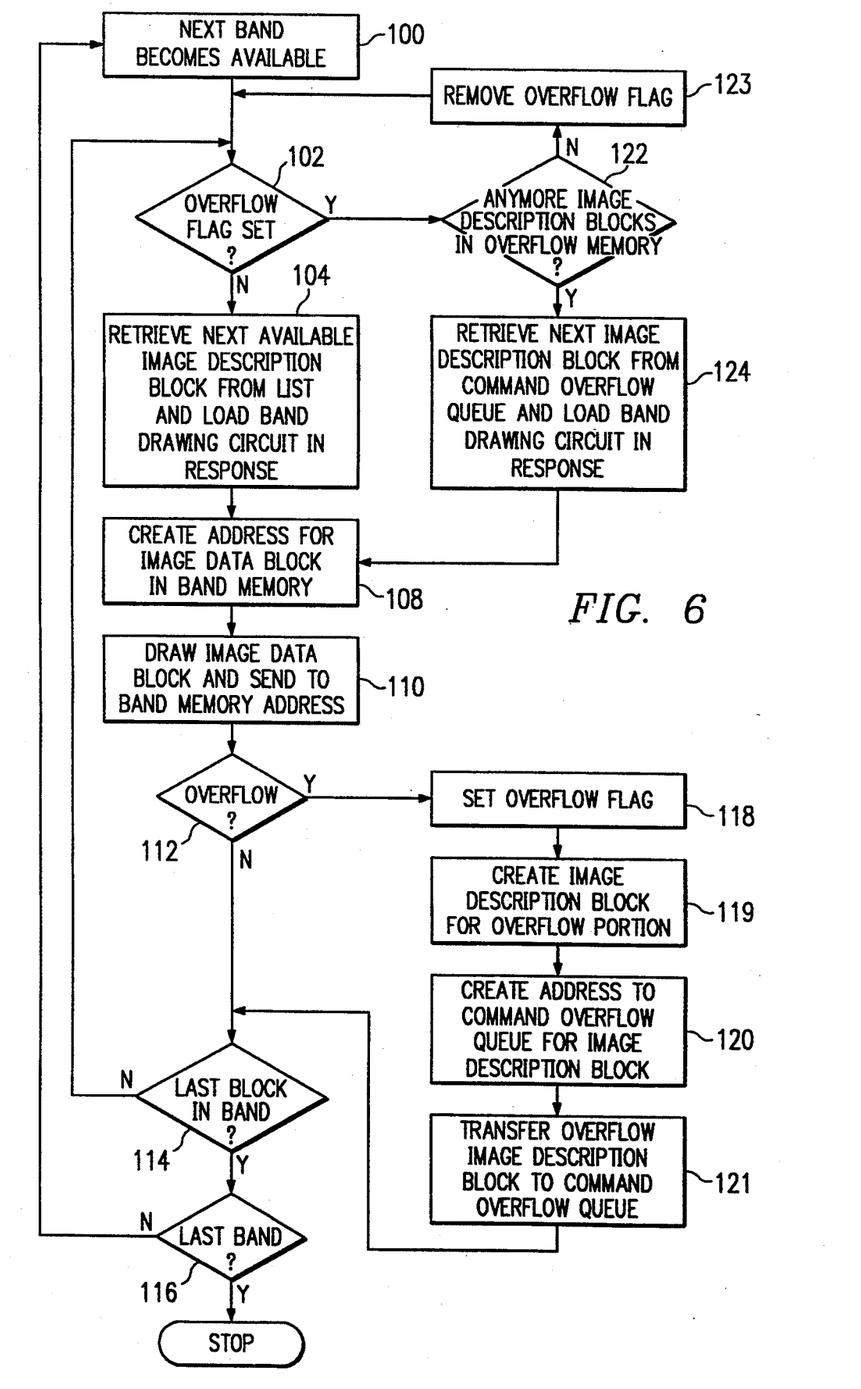
FIG. 6 is a flow chart describing the operation of the band drawing circuit according to the invention.

Turning next to FIG. 6, a flow chart describing the transferring of image data blocks from system memory 45 by band drawing circuit 40 in accordance with image description blocks retrieved from the list created by central processing unit 18. At step 100, a determination is made as to which of the two bands in band memory 50 is available for the transfer of a band of image data. Next, a determination is made at step 102 as to whether an overflow flag has been set by band drawing circuit 40 during the transfer of image data blocks to the previously available band, if any. If no overflow flag is found at step 102, processing continues in the normal fashion at step 104.

At step 104, image description block read control 89 retrieves the next available image description block from the list in system memory 45 and loads band drawing circuit counters to identify the parameters for the block of image data which drawing circuit 40 will retrieve from system memory 45. At step 108, band drawing circuit 40 creates addresses in system memory and band memory which the image data block will be transferred between.

At step 110, the image data block is transferred by drawing circuit 40 from system memory 45 to the selected address in band memory 50 as defined by the image description block. System band memory addresses are incremented for each byte of image data transferred. If no overflow is detected at step 112, and the image data block being transferred is not the last block in the band, the processing is returned to step 102 to 104 to initiate the process of transferring the next block of image data into band memory 50, starting with the retrieval of the next image description block from the list. The process will repeatedly continue through steps 114 and 116 until all the blocks in the band have been transferred, and in turn, all the bands have been sent to print engine 12.

If at step 112, an overflow is detected, a flag is set at step 118. Next, at step 119, an image description block is created for the overflow portion of the image data block being transferred. At step 120, an address is created for the overflow image description data block in the command overflow queue 96. At step 121, the image description block for the overflow portion of the band is transferred to the overflow queue. The processing continues looping back to step 102 to initiate the processing of the next image data block in system memory 45 according to the next image description block in the list in system memory 45. As with the previous image data block, if this block overflows, another overflow image description block is created and sent to the overflow queue. The process continues until the last block in the band has been transferred.

When the next band becomes available, the processing is repeated at step 100 with the selection of that band. At step 102, however, the flag previously set at step 118, will be detected. In this case, processing will first proceed at step 122 with a test to determine if any image description blocks remain in the command overflow queue. At step 124, the next image description block is retrieved from command overflow queue 96 and loaded into the band drawing control circuit and the processing proceeds as before. Once the last block is removed from the command overflow queue, the processing can continue at step 104 with the retrieval in the normal fashion with the image description blocks from the display list created by the central processing unit 18.

If no overflow image description blocks remain, processing proceeds at step 123 with the removal of the overflow flag, followed by a return to step 102. If an image description block does remain in the command overflow queue, however, processing continues with step 124, where that image description block is retrieved. The overflow flag remains in place.

Thus, the present invention provides a means by which an interrupt of the processor can be avoided when an overflow of the banded buffer memory occurs. This reduces processor overhead, allowing the processor to handle other tasks. The overall result is a faster, more error-free printing process.

Further, the present invention employs an unused portion of the banded buffer for the necessary memory in handling the overflow, such that no new memory is required.

Although the present invention has been described in detail, it should be understood that various changes, substitutions and alterations can be made herein without departing from the scope and spirit of the invention as defined by the appended claims.

What is claimed is:

1. Apparatus for handling overflows of data blocks in a system using a partial page or banded buffer, comprising:
   circuitry for transferring a block of data from a memory to a first buffer or band in the partial page or banded buffer;
   circuitry for determining that a portion of said block exceeds a boundary of said first buffer or band;
   circuitry for creating a description block for said portion of said block;
   circuitry for writing said description block into a memory queue; and
   circuitry for transferring said portion of said block into a second buffer or band in the partial page or banded buffer, when a second buffer or band becomes available to receive said portion of said block exceeding a boundary of said first buffer or band.

2. The apparatus of claim 1, wherein said partial page or banded buffer comprises a memory including first and second buffers or bands.

3. The apparatus of claim 1, wherein said memory queue comprises a portion of said memory.

4. The apparatus of claim 1, wherein said memory is defined by addresses in X-Y coordinates.

5. The apparatus of claim 4, wherein said portion of said block which exceeds said boundary exceeds a predetermined Y address.

6. The apparatus of claim 1, wherein said block of data is a block of image data.

7. The apparatus of claim 6, wherein each image data block to be transferred to one of said first and second buffer or bands is defined by its image height and image width in bytes.

8. The apparatus of claim 1, wherein an interrupt of a central processing unit is avoided when an overflow of a partial page or banded buffer memory occurs.

9. A method of handling overflow of data blocks in a system using a partial page or banded buffer, comprising the steps of:
   transferring blocks of data from a memory to a first buffer or band in the partial page or banded buffer;
   determining whether any of the blocks of data being transferred exceeds a boundary of the first buffer or band;
   creating a description block for each block of data which exceeds the boundary of the first buffer or band;
   writing the description blocks into a memory queue; and
   transferring the portion of each data block which exceeds the boundary of the first buffer or band into a second buffer or band in the partial page or banded buffer in accordance with the corresponding description block when the second buffer or band becomes available to receive said portion of said block exceeding a boundary of said first buffer or band.

10. The method of claim 9, wherein the memory queue is located in a section of the partial page or banded buffer.

11. The method of claim 9, wherein the block of data being transferred comprises an image data block.

12. The method of claim 9, wherein the partial page or banded buffer comprises a memory.

13. The method of claim 9, wherein the description block contains parameters defining the location in system memory from where the portion of the data block which overflows the first buffer or band is retrieved and parameters defining the location in the second buffer or band to where the portion of the data block which overflows the first buffer or band is sent.

14. The method of claim 9, wherein said data blocks are image data blocks.

15. A device, comprising:
circuitry for handling overflows of data blocks in a system using a partial page or banded buffer, said circuitry comprising;
means for transferring a block of data from a memory to a first buffer or band in the partial page or banded buffer;
means for determining that a portion of said block exceeds a boundary of said first buffer or band;
means for creating a description block for said portion of said block;
means for writing said description block into a memory queue; and
means for transferring said portion of said block into a second buffer or band in the partial page or banded buffer, when second buffer or band becomes available to receive said portion of said block exceeding a boundary of said first buffer or band.

16. The device of claim 15, wherein said data blocks are image data blocks.

17. The apparatus of claim 16, wherein each image data block to be transferred to one of said first and second buffer or bands is defined by its image height and image width in bytes.

18. The apparatus of claim 15, wherein an interrupt of a central processing unit is avoided when an overflow of a partial page or banded buffer memory occurs.

* * * * *